W. P. FEENEY.
STOCK REGULATOR FOR PAPER MAKING MACHINES.
APPLICATION FILED JAN. 4, 1919.
1,331,057.
Patented Feb. 17, 1920.
2 SHEETS—SHEET 1.
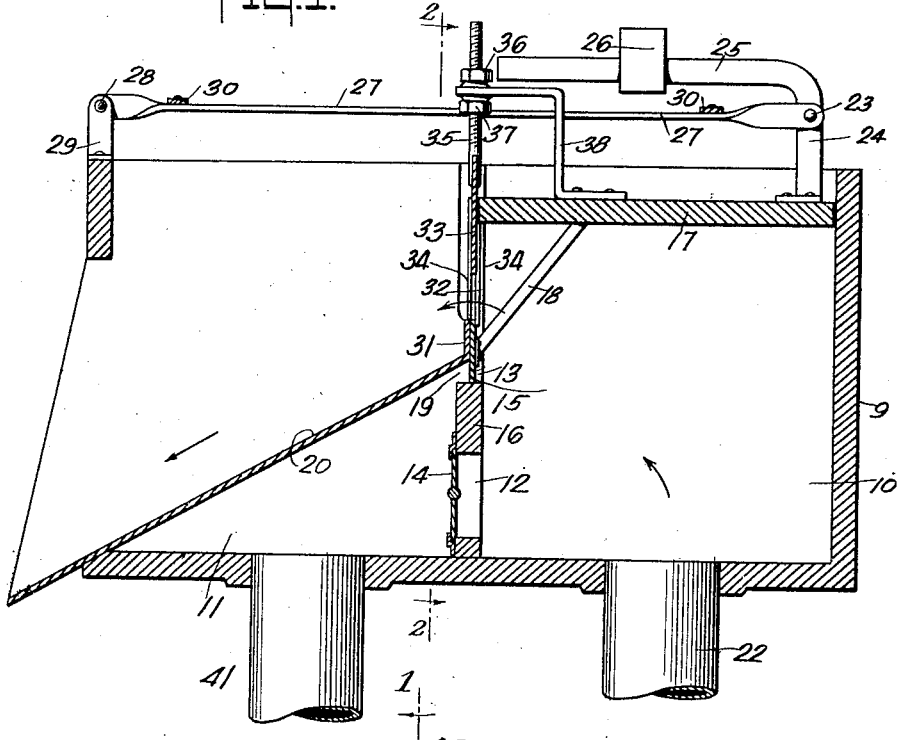
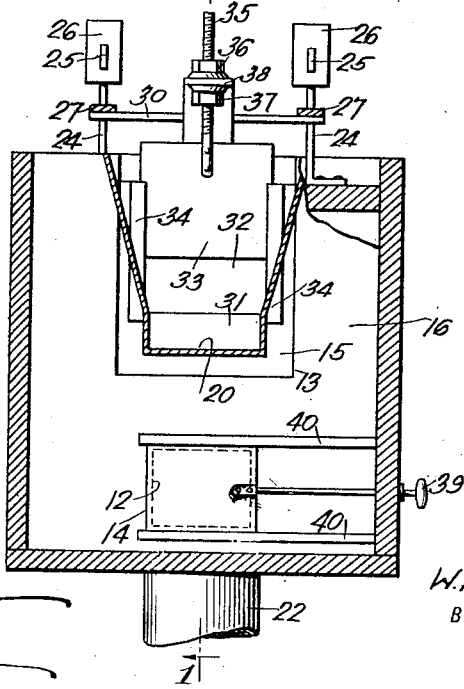
WITNESSES
INVENTOR
W. P. Feeney
BY
ATTORNEYS W. P. FEENEY.
STOCK REGULATOR FOR PAPER MAKING MACHINES.
APPLICATION FILED JAN. 4, 1919.

1,331,057.

Patented Feb. 17, 1920.
2 SHEETS—SHEET 2.

WITNESSES

INVENTOR
W. P. Feeney
BY
ATTORNEYS

UNITED STATES PATENT OFFICE.

WILLIAM P. FEENEY, OF HUDSON FALLS, NEW YORK.

STOCK-REGULATOR FOR PAPER-MAKING MACHINES.

1,331,057.  Specification of Letters Patent.  Patented Feb. 17, 1920.

Application filed January 4, 1919. Serial No. 269,639.

*To all whom it may concern:*

Be it known that I, WILLIAM P. FEENEY, a citizen of the United States, and a resident of Hudson Falls, in the county of Washington and State of New York, have invented a new and Improved Stock-Regulator for Paper-Making Machines, of which the following is a full, clear, and exact description.

Among the principal objects which the present invention has in view are: to vary the supply of the stock from which paper is made in correspondence with the volume of the stock used; to avoid leakage in the cut-off mechanism with which the regulator is provided; and to provide a float for operating said cut-off mechanism so as to avoid any leakage therein.

Drawings.

Figure 1 is a longitudinal vertical section of a regulator constructed and arranged in accordance with the present invention, the section being taken as on the line 1—1 in Fig. 2, the regulator being shown in its normal service position;

Fig. 2 is a cross section of the mixer, the section being taken as on the line 2—2 in Fig. 1;

Description.

Figure 3:
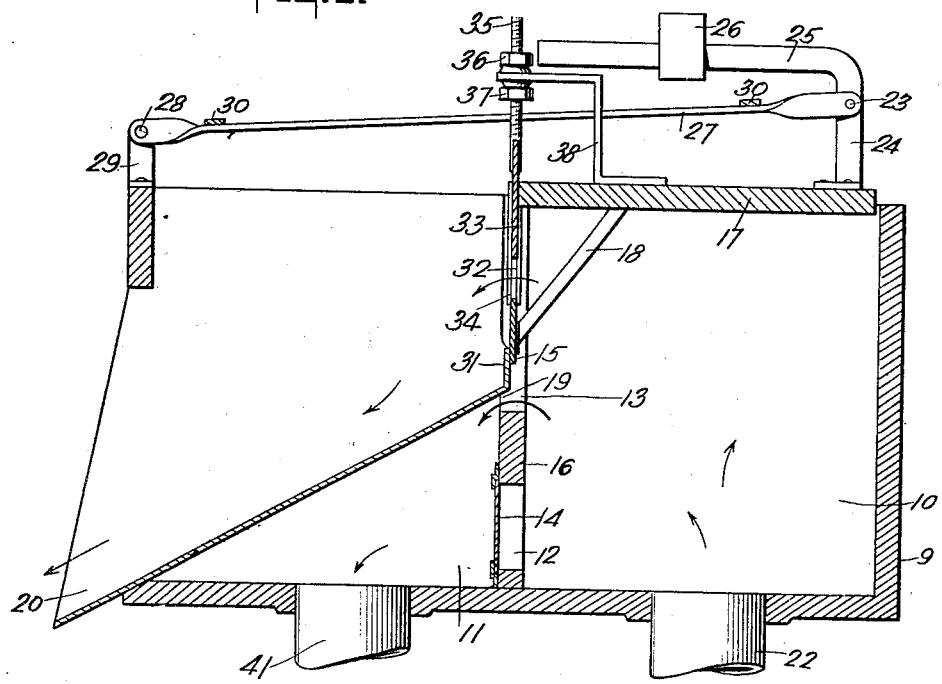
Fig. 3 is a longitudinal section similar to that shown in Fig. 1, showing the operative parts of the regulator as disposed in position to vary the density of the material.
Figure 4:
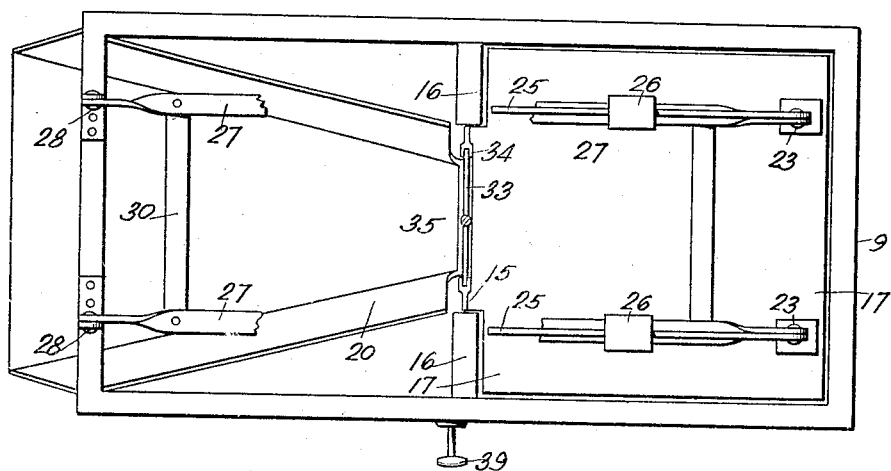
Fig. 4 is a top plan view of the regulator constructed and arranged in accordance with the present invention, a portion of the cut-off mechanism being removed.

As seen in the drawings, the regulator 9 has a receiving compartment 10 and an overflow compartment 11. The two compartments communicate through openings 12 and 13 when the gates 14 and 15, respectively, are removed partially or wholly. The openings 12 and 13 are formed in the partition 16. The gate 15 is freely mounted in the opening 13 and is rigidly connected with a float cover 17 at the forward edge thereof and is held in position thereon by braces 18, as shown best in Figs. 1 and 3 of the drawings. The opening 13 forms a spillway 19, which delivers the material from the compartment 10 to the compartment 11. Normally the gate 15 closes the spillway 19, while the stock from the compartment 10 is delivered to the chute 20 through the gage opening 32. The gage opening 32 is set to govern the normal flow from the compartment 10 to the chute 20. When the inflow of stock from the intake pipe 22 is greater than the gage opening 32 will carry, the level of the stock in the compartment 10 rises until it floats the cover 17 and lifts the same. The gate 15 is elevated with the said cover and the congestion in the compartment 10 is thereby relieved through the spillway 19.

The cover 17 is pivotally mounted by means of pins 23 which extend through gooseneck standards 24, horizontal extensions 25 whereof form slides for the movement of counter-balancing weights 26. The pins 23 are pivotally connected with reach rods 27, pivotally mounted by means of pins 28 in standards 29 at the forward edge of the regulator 9 and of the chamber 11 therein.

The weights 26 are added to the weight of the float cover 17 and parts connected therewith. The said cover is held from frictional engagement with the sides of the compartment 10 by the rods 27. The parallel arrangement of the rods 27 is preserved by the cross rods 30.

A further function of the weights 26 is to preserve the level of the cover 17 and to avoid any frictional engagement between the gate 15 and the flange 31 at the upper end of the chute 20. It is obvious that if the weights 26 are adjusted lengthwise of the extensions 25, the center of gravity or flotation of the cover 17 may be changed or corrected.

By thus regulating the flotation of the cover 17, the movement of the gate 15 is eased and the stock is prevented from overflowing the upper edge of the flange 31, while preserving the sensitiveness of flotation of said cover 17. Under normal conditions, the purpose of this feature of the construction is to compel the stock delivered from the compartment 10 to the chute 20, to pass through the gage opening 32.

The gage opening 32 in the present mechanism functions as the gate in a miner's sluice box, that is, for measuring the full quantity of the stock delivered under full head conditions.

When normally operating, the stock in the compartment 10 fills the same up to the float cover 17, extending above the opening 32. The size of the opening 32 is controlled by a valve gate 33. The gate 33 is mounted in grooves formed by the flanges 34 in the gate 15. The gate 33 is raised and lowered in relation to the gate 15 by means of a screw 35 and set nuts 36 and 37. The nuts 36 and 37 are disposed on opposite sides of the supporting bracket 38, which is rigidly mounted on the float cover 17 and provided with perforations through which the screw 35 passes. It is obvious that by adjusting the nuts 36 and 37, the relative position of the gate 33 and the size of the opening 32 controlled thereby may be varied, with the result that a larger or smaller quantity of the stock delivered from the compartment 10 may be regulated under normal working conditions.

The operation of the regulator above described and shown in the accompanying drawings is as follows: The pipe 22 is connected with the stock pump of the paper-making machinery. From this pump, the material is delivered to the compartment 10. Normally, the weight of the float cover 17 and parts connected therewith depresses the same until the lower edge of the gate 15 rests on the lower edge of the opening 13 in the compartment 16. The capacity of the pipe 22 being greater than the opening 32 under the gate 33, the stock in the compartment 10 quickly rises above the opening 32 until the cover 17 is lifted. When the cover 17 lifts, the gate 15 is also lifted to expose the spillway 19 to a greater or lesser extent.

The spillway 19 primarily provides a safety valve for maintaining the quantity of material in the compartment 10 above the gage opening 32, while the gate 14 is provided as a by-pass for the stock, when it is deemed expedient to suspend delivery of the stock. Under normal conditions, the float cover 17 will rise and fall under the inflow and exhaustion of the stock in the compartment 10, to increase or diminish the spillway 19, and thereby maintain the working level of the stock in the compartment 10.

To open the gate 14, the attendant engages the handle 39, and draws the same outward. The stock is returned to the pump by the pipe 41.

*Claims.*

1. An apparatus as characterized comprising a stock-circulating mechanism embodying normally separated compartments, one to receive and the other to return stock to the source of supply thereof; a spillway normally establishing communication between said compartments; a chute for delivering stock from the compartment receiving the stock from the supply, said chute extending above said spillway; a gate for normally closing said spillway and for regulating the supply to said chute, said gate having a gage-opening therein for regulating the supply to said chute; a float member for supporting said gate; and means for varying the flotation of said float member.

2. An apparatus as characterized comprising a stock-circulating mechanism embodying normally separated compartments, one to receive and the other to return stock to the source of supply thereof; a spillway normally establishing communication between said compartments; a chute for delivering stock from the compartment receiving the stock from the supply, said chute extending above said spillway; a gate for normally closing said spillway and for regulating the supply to said chute, said gate having a gage-opening therein for regulating the supply to said chute; a float member for supporting said gate; a guiding mechanism for said float member, said guiding mechanism embodying articulated levers pivotally connected with said float member at the side thereof removed from said gate, and a dead weight supported on said float member adapted to be shifted to and from the pivotal connection of said member with said levers for varying the effectiveness of said weight member.

3. An apparatus as characterized comprising a stock-circulating mechanism embodying normally separated compartments, one to receive and the other to return stock to the source of supply thereof; a spillway normally establishing communication between said compartments; a chute for delivering stock from the compartment receiving the stock from the supply, said chute extending above said spillway; a gate for normally closing said spillway and for regulating the supply to said chute, said gate having a gage-opening therein for regulating the supply to said chute; a float member for supporting said gate; a guiding mechanism for said float member, said guiding mechanism embodying a plurality of pivoted reach rods, said rods being pivotally connected at the delivery end of said returning compartment; a plurality of standards fixedly mounted on said float member adjacent the edge thereof farthest removed from said returning compartment, said standards having extensions disposed parallel with and in superposed relation to said float member; and a plurality of dead weights slidably mounted on said extensions for varying the flotation of said float member and of the edge thereof directly supporting said gate.

4. An apparatus as characterized comprising a stock-circulating mechanism embodying a plurality of compartments for receiving and returning respectively the stock from and to a stock supply; a partition normally separating said compartments, said partition having formed therein a spillway and normally establishing communication between said compartments; a delivery chute extending into said spillway to receive stock from said receiving compartment; a gate for controlling the opening of said spillway, said gate having a gage opening therein for controlling the flow of stock from said receiving compartment to said chute; and means floated by the stock in said receiving compartment for controlling said gate.

5. An apparatus as characterized comprising a stock-circulating mechanism embodying a plurality of compartments for receiving and returning respectively the stock from and to a stock supply; a partition normally separating said compartments, said partition having formed therein a spillway and normally establishing communication between said compartments; a delivery chute extending into said spillway to receive stock from said receiving compartment; a gate for controlling the opening of said spillway, said gate having a gage opening therein for controlling the flow of stock from said receiving compartment to said chute; means floated by the stock in said receiving compartment for controlling said gate; and means for varying the gage opening in said gate.

6. An apparatus as characterized comprising a stock-circulating mechanism embodying a plurality of compartments for receiving and returning respectively the stock from and to a stock supply; a partition normally separating said compartments, said partition having formed therein a spillway and normally establishing communication between said compartments; a delivery chute extending into said spillway to receive stock from said receiving compartment; a gate for controlling the opening of said spillway, said gate having a gage opening therein for controlling the flow of stock from said receiving compartment to said chute; means floated by the stock in said receiving compartment for controlling said gate; means for varying the gage opening in said gate, said means embodying a screw member and gate valve; and means for fixing the relation of said gate valve on said floated means.

7. An apparatus as characterized comprising a stock-circulating mechanism embodying a plurality of compartments for receiving and returning respectively the stock from and to a stock supply; a partition normally separating said compartments, said partition having formed therein a spillway and normally establishing communication between said compartments; a gate for controlling the opening in said spillway, a delivery chute extending into said spillway to receive stock from said receiving compartment; means floated by the stock in said receiving compartment, for controlling said gate; and means for varying the gage opening in said gate, said means embodying a screw member, a gate valve, a supporting bracket for said screw member, and lock nuts operable for engaging said bracket at the upper and lower side thereof.

WILLIAM P. FEENEY.